United States Patent
Kříž

(10) Patent No.: US 11,170,053 B2
(45) Date of Patent: Nov. 9, 2021

(54) LENGTH OF THE LONGEST COMMON SUBSEQUENCE ALGORITHM OPTIMIZATION

(71) Applicant: Avast Software s.r.o., Prague (CZ)

(72) Inventor: Antonín Kříž, Prachatice (CZ)

(73) Assignee: Avast Software s.r.o., Prague (CZ)

( * ) Notice: Subject to any disclaimer, the term of this patent is extended or adjusted under 35 U.S.C. 154(b) by 695 days.

(21) Appl. No.: 15/178,235

(22) Filed: Jun. 9, 2016

(65) Prior Publication Data

US 2016/0364457 A1    Dec. 15, 2016

Related U.S. Application Data

(60) Provisional application No. 62/173,257, filed on Jun. 9, 2015.

(51) Int. Cl.
    *G06F 16/903*    (2019.01)

(52) U.S. Cl.
    CPC .............. *G06F 16/90348* (2019.01)

(58) Field of Classification Search
    CPC .......... G06F 16/90348; G06F 16/2453; G06F 16/2455; G06F 16/2474; G06F 16/8365; G06K 9/6212
    See application file for complete search history.

(56) References Cited

U.S. PATENT DOCUMENTS

| | | | | |
|---|---|---|---|---|
| 2006/0080437 A1* | 4/2006 | Lake | ................ | G06F 17/30887 709/225 |
| 2009/0129676 A1* | 5/2009 | Zandifar | .............. | G06K 9/0055 382/177 |
| 2013/0191469 A1* | 7/2013 | Dichiu | .................... | H04L 51/12 709/206 |
| 2016/0085785 A1* | 3/2016 | Hoffmann | ........... | G06F 16/2428 707/754 |

OTHER PUBLICATIONS

Allison et al., A Bit-String Longest-Common-Subsequence Algorithm, Information Processing Letters, Nov. 24, 1986, 7 Pages, vol. 23 Issue 5, Elsevier B.V.

Longest common subsequence problem, 13 Pages, https://en.wikipedia.org/wiki/Longest_common_subsequence_problem, Accessed Sep. 6, 2016.

Ozsoy et al., Fast Longest Common Subsequence with General Integer Scoring Support on GPUs, Proceedings of Programming Models and Applications on Multicores and Manycores, 2014, 11 Pages, ACM, New York, USA.

* cited by examiner

*Primary Examiner* — Cheyne D Ly
(74) *Attorney, Agent, or Firm* — Erickson Kernell IP, LLC; William B. Kircher

(57) ABSTRACT

Systems and methods perform various optimizations of an LLCS algorithm for use in determining if a set of input sequences are similar to a query sequence. The optimizations include filtering out sequence from the set of input sequences where the estimated similarity of the sequence with the query sequence is below a threshold value. The remaining sequences can then be provided to an LLCS algorithm where the output of the LLCS algorithm is used in a similarity function to determine an actual similarity of an input sequence with a query sequence.

9 Claims, 4 Drawing Sheets

LENGTH OF THE LONGEST COMMON SUBSEQUENCE ALGORITHM OPTIMIZATION

CROSS-REFERENCE TO RELATED APPLICATIONS

This Application claims priority to U.S. Provisional Patent Application Ser. No. 62/173,257, filed on Jun. 9, 2015, to Antonín Kříž, entitled "Length of the Longest Common Subsequence Algorithm Optimization," the entire disclosure of which is incorporated herein by reference.

FIELD OF THE INVENTION

The disclosure relates generally to a Length of the Longest Common Subsequence (LLCS) algorithm, and more particularly, to techniques for optimizing an LLCS algorithm.

BACKGROUND OF THE INVENTION

The LLCS algorithm can be used to indicate the length of the longest common subsequence in a set of strings. For the purposes of the LLCS algorithm, the longest common subsequence is longest subsequence common to all of the input strings. Subsequences are not required to occupy consecutive positions within the original sequences. As an example, given the string "ABCDE" and the string "ACDF", the longest common subsequence is the sequence "ACD", and the LLCS algorithm will return a value of 3 representing the length of the sequence "ACD."

The LLCS algorithm is an NP-hard problem, which means that large sets of input sequences may require years or even millennia of computation time to determine a result.

SUMMARY OF THE INVENTION

Systems and methods of the present invention perform optimizations of an LLCS algorithm for use in determining if a set of input sequences are similar to a query sequence. In an embodiment of a system of the invention, the system receives a set of sequences, a query sequence, and a similarity threshold.

The set of sequences, the query sequence, and the similarity threshold are provided as input to an algorithm that produces as output a results set of sequences that meet the similarity threshold with respect to the query sequence. The set of input sequences are filtered to eliminate sequences that cannot possibly be a part of the results set of sequences that meet the similarity threshold. As described below, multiple types of filters can be used. An LLCS algorithm is then used to compare the filtered subset of input sequences with the query sequence to determine which, if any, of the filtered subset of input sequences are in the result set of sequences that meet the similarity threshold with respect to the query sequence.

More particularly, the system includes a size filter, a histogram filter, a similarity determination unit, and a top filter. In addition to the set of sequences, the query sequence, and the similarity threshold, a result set size parameter is provided. The result set size can specify a maximum number of sequences that are desired in the result set.

The size filter receives the input sequences and query sequence and filters out sequences which do not meet the similarity threshold base on the size of the sequence. The size filter utilizes a similarity function that determines a similarity value for two sequences.

The histogram filter receives the input sequence as filtered by the size filter. The histogram filter creates histograms that include a histogram of the query sequence and a histogram for each of the input sequences that remain after the size filtering. The histogram filter determines a similarity of the histogram of an input sequence with the histogram of the query sequence. The histogram filter determines a similarity value for the input sequence. If the similarity value is below the similarity threshold, the input sequence associated with the input sequence histogram is filtered out and thus removed from further consideration. If the similarity value is at or above the similarity threshold, then the input sequence is retained and the similarity value is associated with the input sequence for later use.

The remainder sequences are the set of sequences that remain after being filtered by the size filter and histogram filter. In some embodiments, the remainder sequences are sorted based on the similarity value computed by the histogram filter. In some embodiments, the remainder sequences and query sequence are provided to the similarity determination unit. The similarity determination unit determines a similarity between a sequence in the remainder set and the query sequence. In some embodiments, the similarity determination unit uses the length of the remainder sequence, the length of the query sequence, and the value returned from an LLCS algorithm as input to a similarity function. If the similarity function returns a value at or above the similarity threshold, the remainder sequence can be placed in a results set.

Additionally, a top filter may be used to examine the results set to determine if the similarity determination unit can be stopped prior to finishing the similarity comparison of sequences in the remainder sequences with the query sequence. Further, a LLCS loop monitor may be used to end the LLCS computation if it can be determined that enough of the sequence has been processed, and the remainder of the sequence is either too short or too long (based on the logic of the size filter) to provide relevant data. Additionally, the LLCS loop monitor can end the LLCS computation for a sequence if the remainder of the sequence does not contain any relevant data based on the histogram of the sequence.

The systems and methods can reduce the computation time required to perform for a similarity determination using an LLCS computation. In particular, by filtering out sequences that cannot be in the results set, computation time can be reduced.

DESCRIPTION OF THE SEVERAL VIEWS OF THE DRAWING

For a better understanding of the inventive subject matter, reference may be made to the accompanying drawings in which.

DETAILED DESCRIPTION OF THE INVENTION

Figure 1:
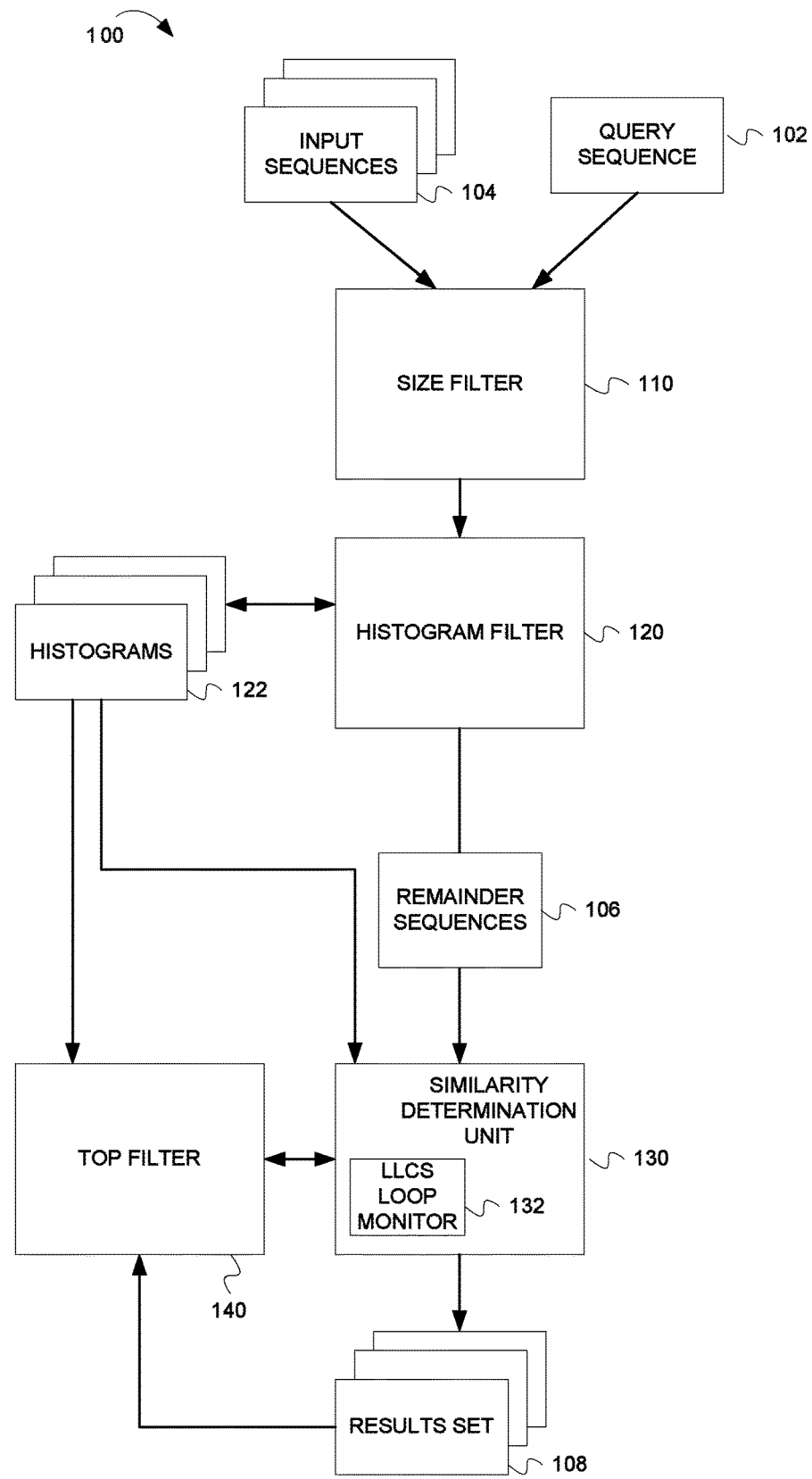
FIG. 1 is a block diagram of an operating environment for a system that determines similarity of a set of input sequences with a query sequence.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

The disclosure includes systems and methods that can reduce the computation time required to perform for a similarity determination using an LLCS computation. According to some aspects of the disclosure, a set of sequences, a query sequence, and a similarity threshold are provided as input to an algorithm that produces as output a results set of sequences that meet the similarity threshold with respect to the query sequence. The set of input sequences are filtered to eliminate sequences that cannot possibly be a part of the results set of sequences that meet the similarity threshold. As described below, multiple types of filters can be used. An LLCS algorithm is then used to compare the filtered subset of input sequences with the query sequence to determine which, if any, of the filtered subset of input sequences are in the result set of sequences that meet the similarity threshold with respect to the query sequence. By filtering out sequences that cannot be in the results set, computation time can be reduced. In some embodiments, the LLCS algorithm can be monitored and/or modified to further reduce the computation time to produce the results set.

FIG. 1 is a block diagram of an operating environment for a system 100 that determines similarity of a set of input sequences with a query sequence. According to some embodiments, system 100 can include a size filter 110, a histogram filter 120, a similarity determination unit 130 and a top filter 140.

In some embodiments, input to system 100 comprises input sequences 104 and a query sequence 102. In addition, a similarity threshold may be provided as an input parameter, a configuration parameter, or a predetermined value. A sequence can be any arbitrary data. Examples of a sequences include, but are not limited to, Uniform Resource Locators (URLs), text strings, file names, entire data files, etc.

In some embodiments, a result set size parameter may be provided as an input parameter, a configuration parameter, or a predetermined value. The result set size can specify a maximum number of sequences that are desired in the result set.

At some points in the disclosure below, an example will be used to provide a context for the description. In the example, "S" represents the set of input sequences 104, "X" represents the query string 102. Additionally, for the purposes of the example, a similarity threshold of 0.8 and result set size of 10 are used.

In some embodiments, size filter 110 receives the input sequences 104 and query sequence 102. Size filter 110 filters out sequence which do not meet the similarity threshold base on the size of the sequence. In some aspects, size filter 110 does not consider the actual values of the data in the input sequence and query sequence, it filters based on size alone. In other words, the size filter removes sequences that cannot meet the similarity threshold even if is assumed that the entire input sequence is a subsequence of the query sequence. For example, based on size alone, it can be determined that an input sequence of "ABC" cannot meet the similarity threshold of 0.8 if the query sequence is "ABCDEFGHIJKL" despite the fact that all of the characters in the input sequence appear in the query sequence.

The size filter 110 utilizes a similarity function that determines a similarity value for two sequences. In some aspects, the similarity function takes three parameters, x, y and w, where x is the length of a first sequence, y is the length of a second sequence, and w is the length of the longest subsequence of x and y. One example of such a similarity function used in some embodiments is the cosine similarity function:

$$f(x,y,w)=w/\text{sqrt}(x*y) \qquad (1)$$

However, other similarity functions can be used and are within the scope of the inventive subject matter.

The size filter 110 calls the similarity function for each string in the input sequence 104, with "ideal" parameters. The ideal parameters assume maximal similarity between the input sequence and the query sequence. Thus, for the cosine similarity function "f" described above, the size filter 110 calls the similarity function for each sequence in the set of input sequences as follows:

$$f(\text{length}(Sn), \text{length}(X), \min(\text{length}(Sn), \text{length}(X))) \quad (3)$$

where Sn is the nth individual sequence in a set of input sequences 104, and X is the query string 102. A sequence Sn is eliminated from further consideration if the value returned by the similarity function is less than the similarity threshold.

In some embodiments, the histogram filter 120 receives the input sequence as filtered by the size filter 110. The histogram filter 120 creates histograms 122 that include a histogram of the query sequence 102 and a histogram for each of the input sequences 104 that remain after the size filtering. The histogram filter uses the principle that two sequences cannot be more similar than their respective histograms. The histogram filter 120 determines a similarity of the histogram of an input sequence with the histogram of the query sequence. The histogram filter determines a similarity value for the input sequence. If the similarity value is below the similarity threshold, the input sequence associated with the input sequence histogram is filtered out and thus removed from further consideration. If the similarity value is at or above the similarity threshold, then the input sequence is retained and the similarity value is associated with the input sequence for later use. Because the histogram filter 120 considers the content of an input sequence and the query sequence 102, the histogram filter 120 can be more precise than the size filter 110 (i.e., the histogram filter 120 may filter out more sequences than the size filter 110). In some embodiments, some or all of the histogram filter 120 can be implemented on vector processors or graphical processing units (GPUs), which can further reduce the computation time.

The remainder sequences 106 are the set of sequences that remain after being filtered by the size filter 110 and histogram filter 120 In some embodiments, the remainder sequences 106 can be sorted based on the similarity value computed by the histogram filter.

The remainder sequences 106 and query sequence 102 can be provided to similarity determination unit 130. The similarity determination unit 130 proceeds to determine a similarity between a sequence in the remainder set and the query sequence 102. In some embodiments, the similarity determination unit uses the length of the remainder sequence, the length of the query sequence 102, and the value returned from an LLCS algorithm as input to the similarity function described above. If the similarity function returns a value at or above the similarity threshold, the remainder sequence can be placed in the results set 108.

In some embodiments, top filter 140 examines results set 108 to determine if the similarity determination unit can be stopped prior to finishing the similarity comparison of sequences in the remainder sequences 106 with the query sequence 102. According to some aspects of the disclosure, after the number of sequences placed in the results set 108 reaches the result set size parameter, the top filter 140 determines if the results set 108 represents the "best" set of sequences in the remainder sequences 106. The top filter 140 examines the similarity values associated with the unprocessed sequences in the remainder set to determine if the most similar string in the unprocessed sequences has the same or smaller similarity value than the smallest similarity value in the results set. If so, then the top filter can terminate execution of the similarity determination unit 130 because the best results have already been determined.

In some embodiments, top filter 140 can pause computation by the similarity determination unit 130 after a period of time has elapsed (and after the results set has at least a number of result sequence equal to the result set size parameter). The top filter 140 can then determine a deviation of the results set 106 and a similarity value of the most similar sequence in the remainder set that has not yet been processed. If the most similar unprocessed sequence has a similarity value that is outside of the deviation of the results set 106, the top filter 140 can prematurely terminate execution of the similarity determination unit 130. In this case, the results set is valid, but may not be the best possible result set.

A further aspect of the disclosure is the LLCS loop monitor 132. The LLCS loop monitor 132 ends the LLCS computation if it can be determined that enough of the sequence has been processed, and the remainder of the sequence is either too short or too long (base on the logic of the size filter) to provide relevant data. Additionally, the loop monitor 132 can end the LLCS computation for a sequence if the remainder of the sequence does not contain any relevant data based on the histogram of the sequence.

Figure 2:
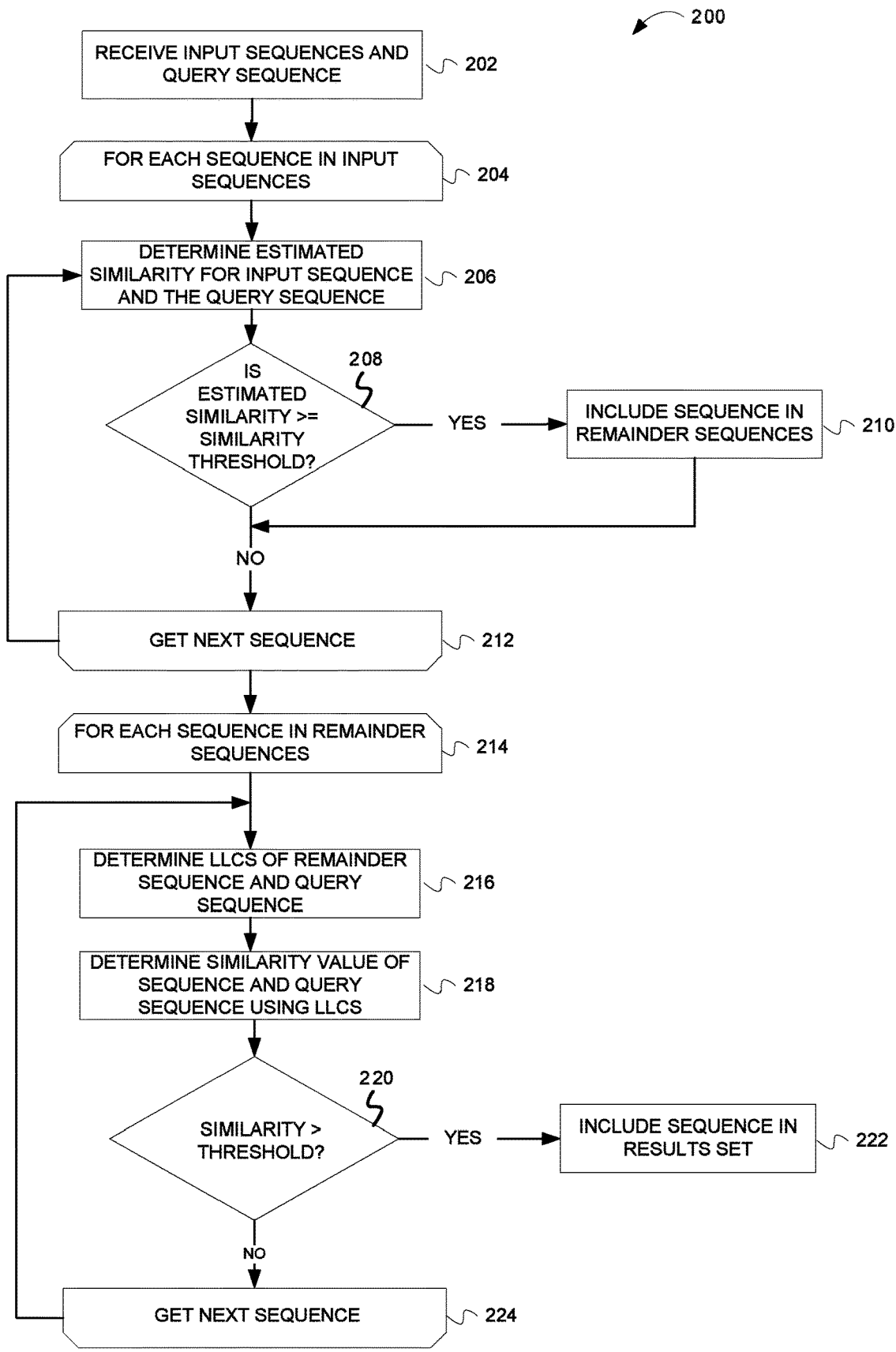
FIG. 2 is a flow chart illustrating operations of a method to optimize LLCS computation.

FIG. 2 is a flow chart 200 illustrating operations of a method to optimize LLCS computation.

At block 202, a system executing the method receives input sequences and a query sequence. The end goal of the method is to determine sequences in the set of input sequences that are sufficiently similar to the query sequence based on the similarity threshold. The input sequences and the query sequence can be any sequence of data. As noted above, the examples of sequences include, but are not limited to, URLs, text strings, file names, data files, etc. Additionally, as noted above, a result set size parameter may be provided as an input parameter, a configuration parameter, or a predetermined value. The result set size can specify a maximum number of sequences that are desired in the result set.

Blocks 204-212 are operations that can be performed by one or more filters. Example filters have been described above and include a size filter and a histogram filter.

At block 204 is the beginning of a loop that iterates through sequences in the input sequences.

At block 206, the filter determines an estimated similarity value of the current input sequence and the query sequence. The estimated similarity value can be determined using an algorithm that can be executed in less time than an algorithm that is used to compute an actual similarity value. In order to avoid filtering out sequences that should in fact be retained, the algorithm used to estimate the similarity can be designed to produce an estimated similarity value that is no less than the actual similarity value. For example, the size filter discussed above determines an estimated similarity by assuming that either the entire query sequence or the entire input sequence is the longest common subsequence. Thus the estimated similarity value is guaranteed to be no less than the actual similarity value. Similarly, the histogram filter discussed above provides an estimated similarity value for input sequences based on a comparison of histograms for the input sequences and the query sequence. As noted above, the histogram filter uses the principle that two sequences cannot be more similar than their respective histograms. Thus, the estimated similarity value provided by the histogram filter is no less than the actual similarity value of the input sequence and the query sequence.

At block 208, a check is made to determine if the estimated similarity value meets or exceeds the similarity threshold. If so, then at block 210, the current input sequence is included in the set of remainder sequences. In other words, the current input sequence is not filtered from the input set.

If the check at block 208 determines that the estimated similarity value is less than the similarity threshold, then the method proceeds to block 212 to get the next sequence from the input sequences. In this case, the current sequence is not retained in the set of remainder sequences and is thus filtered out.

Blocks 204-212 may be repeated based on the number of filters present. In the example illustrated in FIG. 1, two filters, a size filter 110 and a histogram filter 120 are used. However, other implementations based on the disclosure may include fewer or more filters.

Blocks 214-224 are executed after the filters of blocks 204-212 have been completed. Block 214 is the start of a loop that iterates through the sequences in the remainder sequences (i.e., those sequences from the input sequences that were not filtered out by the filters of blocks 204-212), and determines a result set comprising sequences in the remainder sequences where the actual similarity values of the sequences meet or exceed a similarity threshold with respect to the query sequence.

At block 216, an LLCS is determined with respect to the current remainder sequence and the query sequence.

At block 218, an actual similarity value is determined using the LLCS determined at block 216. In some embodiments, the actual similarity value is determined using a similarity function such as that described by equation (1) above. In such embodiments, the parameters supplied to the similarity function are thus:

$$f(\text{length}(Rn), \text{length}(X), \text{LLCS}) \qquad (3)$$

where Rn is the current remainder sequence, and X is the query sequence.

At block 220, a check is made to determine if the actual similarity value of the current remainder sequence and the query sequence meets or exceeds the similarity threshold. If the actual similarity value meets or exceeds the threshold, then at block 222, the current remainder sequence is included in a results set.

If the check at block 220 determines that the actual similarity value does not meet or exceed the similarity threshold, the current remainder sequence is not included in the results set, and at block 224, the method obtains the next sequence in the remainder set. The method then returns to block 216.

Figure 3:
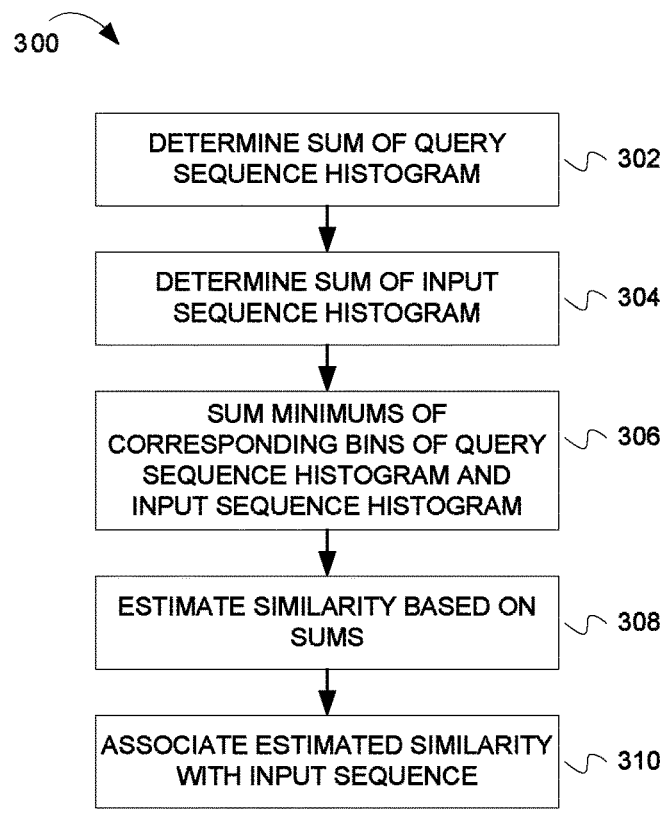
FIG. 3 is a flow chart illustrating operations of a method determining an estimated similarity using a histogram filter.

FIG. 3 is a flow chart 300 illustrating operations of a method determining an estimated similarity using a histogram filter. At block 302, the method determines a first sum (sum1) of the counts for each bin in the query sequence histogram.

At block 304, the method determines a second sum (sum2) of the counts for each bin of an input sequence histogram.

At block 306, a third sum (sum3) is determined by summing a minimum from each bin of input sequence histogram and the corresponding bin of the query sequence histogram. Pseudo-code representing determination of the third sum is as follows: for i in 0 . . . 255 do sum3+=min (histA[i], histB[i])

where histA and histB are the input sequence histogram and the query sequence histogram.

At block 308, an estimated similarity is determined from the sums determined at blocks 302, 304 and 306. In some embodiments, the similarity value is determined using a similarity function such as that described by equation (1) above. In such embodiments, the parameters supplied to the similarity function are thus:

$$f(\text{sum1}, \text{sum2}, \text{sum3}) \qquad (4)$$

At block 310, the estimated similarity determined at block 308 is saved and associated with the input sequence. This allows the estimated similarity to be used in later filters or processes.

Figure 4:
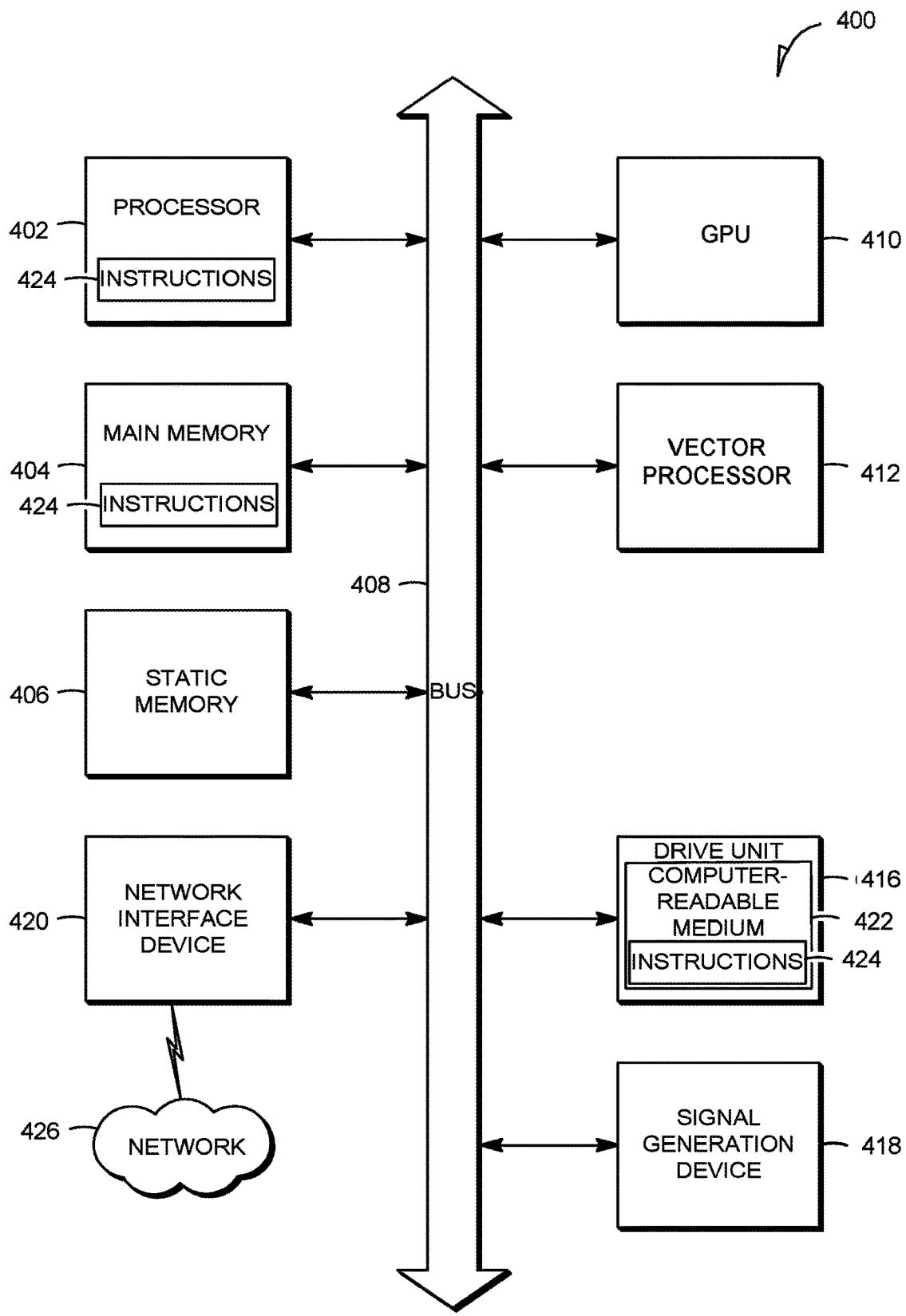
FIG. 4 is a block diagram of an example embodiment of a computer system upon which embodiments of the inventive subject matter can execute.

FIG. 4 is a block diagram of an example embodiment of a computer system 400 upon which embodiments of the inventive subject matter can execute. The description of FIG. 4 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As noted above, the system as disclosed herein can be spread across many physical hosts. Therefore, many systems and sub-systems of FIG. 4 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

In the embodiment shown in FIG. 4, a hardware and operating environment is provided that is applicable to both servers and/or remote clients.

With reference to FIG. 4, an example embodiment extends to a machine in the example form of a computer system 400 within which instructions for causing the machine to perform any one or more of the methodologies discussed herein may be executed. In alternative example embodiments, the machine operates as a standalone device or may be connected (e.g., networked) to other machines In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 400 may include a processor 402 (e.g., a central processing unit (CPU), a graphics processing unit (GPU) 410 or both), a main memory 404 and a static memory 406, which communicate with each other via a bus 408. In some embodiments, the computer system 400 can include one or more vector processors 412, a disk drive unit 416, a signal generation device 418 (e.g., a speaker), and a network interface device 420.

The disk drive unit 416 includes a machine-readable medium 422 on which is stored one or more sets of instructions 424 and data structures (e.g., software instructions) embodying or used by any one or more of the methodologies or functions described herein. The instructions 424 may also reside, completely or at least partially, within the main memory 404 or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 424 may further be transmitted or received over a communications network 426 using a signal transmission medium via the network interface device 420 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for determining similar sequences, the method comprising:
   receiving a plurality of input sequences and a query sequence;
   performing one or more filters that, for each input sequence in the plurality of input sequences, performs operations including:
   determining an estimated similarity value for the input sequence and the query sequence, wherein the estimated similarity value is determined such that the estimated similarity value is greater than or equal to an actual similarity value;
   including the input sequence in a set of remainder sequences in response to determining that the estimated similarity value is at or above a similarity threshold, wherein the set of remainder sequences is comprised of all of the input sequences in the plurality of input sequences having the estimated similarity value at or above the similarity threshold;
   wherein the one or more filters include a histogram filter that performs operations including creating histograms for the query sequence and one or more of the input sequences in the plurality of input sequences, and wherein the histogram filter performs further operations including:
   determining a first sum of a first histogram of the query sequence,
   determining a second sum of a second histogram of the input sequence,
   determining a third sum comprising a sum of a minimum from each bin of the first histogram and a corresponding bin of the second histogram,
   wherein determining the estimated similarity value includes determining the estimated similarity value based, at least in part, on the first sum, the second sum, and the third sum; and
   wherein the operations further include associating the estimated similarity value with the input sequence; and
   determining a results set, said determining including, for each remainder sequence in the set of remainder sequences:
   determining a length of the longest common subsequence (LLCS) of the remainder sequence and the query sequence,
   determining a similarity value of the remainder sequence and the query sequence based, at least in part, on the LLCS, and
   in response to determining that the similarity value is above the similarity threshold, including the remainder sequence in the results set.

2. The method of claim 1, wherein the one or more filters include a size filter that performs operations including:
   determining a size of the input sequence; and
   determining a size of the query sequence;
   wherein determining the estimated similarity value includes determining the estimated similarity value based, at least in part, on the size of the input sequence, the size of the query sequence, and a minimum of the size of the input sequence and the size of the query sequence.

3. The method of claim 1, further comprising:
determining whether a number of sequences in the results set is equal to or greater than a result set size; and
in response to determining that the number of sequences in the results set is equal to or greater than the result set size, performing operations including:
  determining a most similar sequence in a subset of sequences in the set of remainder sequences, the subset comprising remainder sequences for which an LLCS has not been determined,
  in response to determining that the estimated similarity value of the most similar sequence is less than or equal to the similarity value of a least similar sequence in the results set, terminating determining the results set.

4. A system for determining similar sequences, the system comprising:
at least one electronic processor for executing at least one algorithm, wherein said system:
  receives a plurality of input sequences and a query sequence;
  performs one or more filters that, for each input sequence in the plurality of input sequences, performs operations including:
    determining an estimated similarity value for the input sequence and the query sequence, wherein the estimated similarity value is determined such that the estimated similarity value is greater than or equal to an actual similarity value, and
    including the input sequence in a set of remainder sequences in response to determining that the estimated similarity value is at or above a similarity threshold, wherein the set of remainder sequences is comprised of all of the input sequences in the plurality of input sequences having the estimated similarity value at or above the similarity threshold,
    wherein the one or more filters include a histogram filter that performs operations including creating histograms for the query sequence and one or more of the input sequences in the plurality of input sequences, and wherein the histogram filter performs further operations including:
      determining a first sum of a first histogram of the query sequence,
      determining a second sum of a second histogram of the input sequence,
      determining a third sum comprising a sum of a minimum from each bin of the first histogram and a corresponding bin of the second histogram,
      wherein determining the estimated similarity value includes determining the estimated similarity value based, at least in part, on the first sum, the second sum, and the third sum; and
    wherein the operations further include associating the estimated similarity value with the input sequence; and
  determines a results set, said determining including, for each remainder sequence in the set of remainder sequences:
    determining a length of the longest common subsequence (LLCS) of the remainder sequence and the query sequence,
    determining a similarity value of the remainder sequence and the query sequence based, at least in part, on the LLCS, and
    in response to determining that the similarity value is above the similarity threshold, including the remainder sequence in the results set.

5. The system of claim 4, wherein the one or more filters include a size filter that performs operations including:
determining a size of the input sequence; and
determining a size of the query sequence;
wherein determining the estimated similarity value includes determining the estimated similarity value based, at least in part, on the size of the input sequence, the size of the query sequence, and a minimum of the size of the input sequence and the size of the query sequence.

6. The system of claim 4, wherein said system—
determines whether a number of sequences in the results set is equal to or greater than a result set size; and
in response to determining that the number of sequences in the results set is equal to or greater than the result set size, performs operations including:
  determining a most similar sequence in a subset of sequences in the set of remainder sequences, the subset comprising remainder sequences for which an LLCS has not been determined,
  in response to determining that the estimated similarity value of the most similar sequence is less than or equal to the similarity value of a least similar sequence in the results set, terminating determining the results set.

7. A non-transitory computer readable medium containing program instructions for determining similar sequences, wherein execution of the program instructions by one or more processors of a computer system causes the one or more processors to carry out the steps of:
receiving a plurality of input sequences and a query sequence;
performing one or more filters that, for each input sequence in the plurality of input sequences, performs operations including:
  determining an estimated similarity value for the input sequence and the query sequence, wherein the estimated similarity value is determined such that the estimated similarity value is greater than or equal to an actual similarity value, and
  including the input sequence in a set of remainder sequences in response to determining that the estimated similarity value is at or above a similarity threshold, wherein the set of remainder sequences is comprised of all of the input sequences in the plurality of input sequences having the estimated similarity value at or above the similarity threshold,
  wherein the one or more filters include a histogram filter that performs operations including creating histograms for the query sequence and one or more of the input sequences in the plurality of input sequences, and wherein the histogram filter performs further operations including:
    determining a first sum of a first histogram of the query sequence,
    determining a second sum of a second histogram of the input sequence,
    determining a third sum comprising a sum of a minimum from each bin of the first histogram and a corresponding bin of the second histogram, wherein determining the estimated similarity value includes determining the estimated similarity value based, at least in part, on the first sum, the second sum, and the third sum; and wherein the operations further include associating the estimated similarity value with the input sequence; and determining a results set, said determining including, for each remainder sequence in the set of remainder sequences:

determining a length of the longest common subsequence (LLCS) of the remainder sequence and the query sequence, determining a similarity value of the remainder sequence and the query sequence based, at least in part, on the LLCS, and in response to determining that the similarity value is above the similarity threshold, including the remainder sequence in the results set.

8. The non-transitory computer readable medium claim 7, wherein the one or more filters include a size filter that performs operations including:

determining a size of the input sequence; and
determining a size of the query sequence;

wherein determining the estimated similarity value includes determining the estimated similarity value based, at least in part, on the size of the input sequence, the size of the query sequence, and a minimum of the size of the input sequence and the size of the query sequence.

9. The non-transitory computer readable medium of claim 7, wherein execution of the program instructions by one or more processors of the computer system causes the one or more processors to carry out the steps of:

determining whether a number of sequences in the results set is equal to or greater than a result set size; and in response to determining that the number of sequences in the results set is equal to or greater than the result set size, performing operations including:

determining a most similar sequence in a subset of sequences in the set of remainder sequences, the subset comprising remainder sequences for which an LLCS has not been determined, in response to determining that the estimated similarity value of the most similar sequence is less than or equal to the similarity value of a least similar sequence in the results set, terminating determining the results set.

* * * * *